Patented July 4, 1950

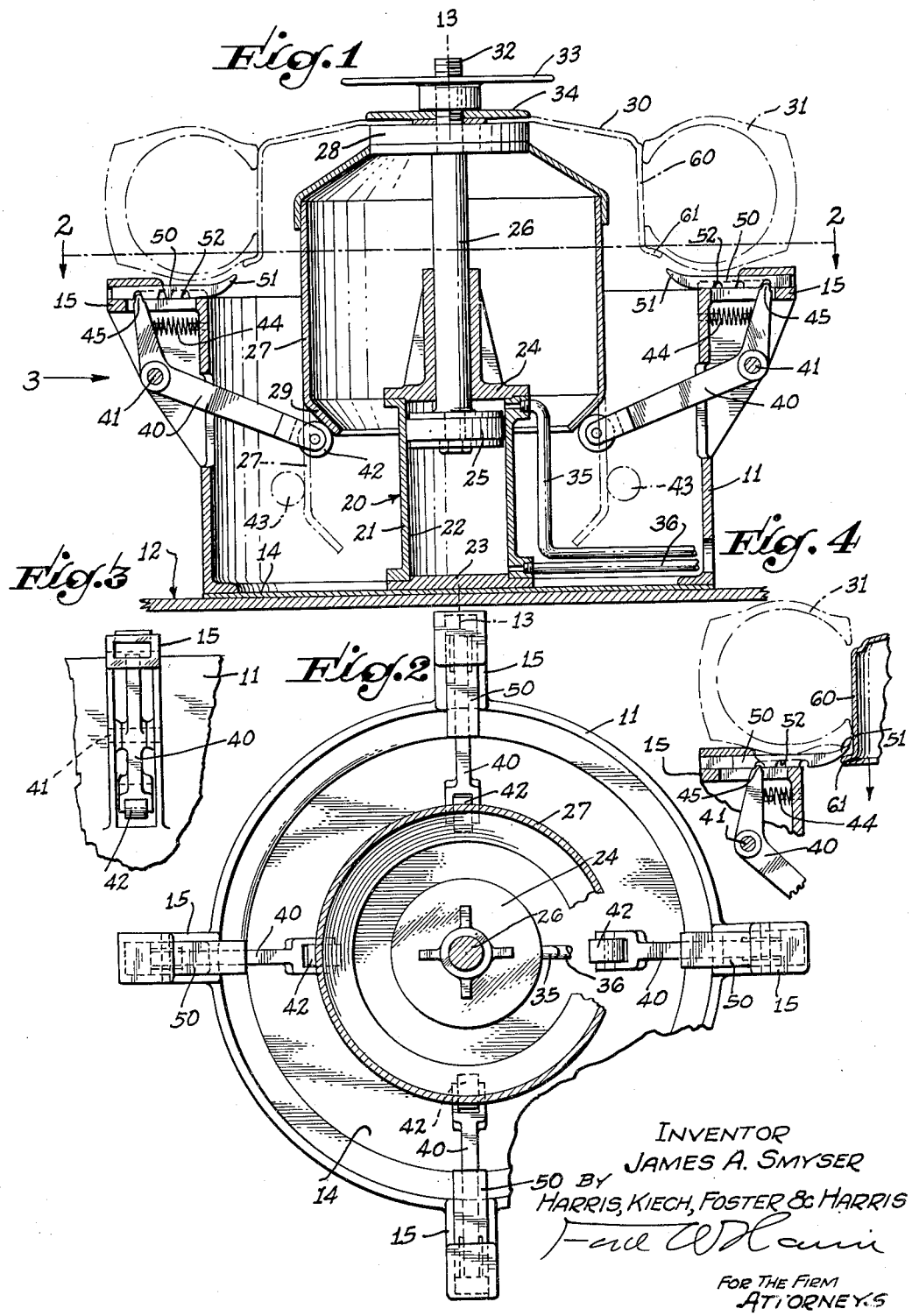

2,513,756

UNITED STATES PATENT OFFICE 2,513,756

AXIALLY SHIFTING TYPE FLUID PRESSURE OPERATED TIRE REMOVING MACHINE

James A. Smyser, Taft, Calif.

Application June 19, 1945, Serial No. 600,263

5 Claims. (Cl. 157—1.2)

1

My invention relates to machines for removing pneumatic tires from the rims of wheels, and it is an object of the invention to provide a power operated machine which will readily and quickly force such tires off the rims of said wheels, and which is sufficiently powerful to remove heavy truck tires from rims to which the tires adhere very tightly after they have been in service for long periods.

Further objects and advantages will be made evident hereinafter.

In the drawing, which is for illustrative purposes only,

Fig. 1 is a vertical section through a machine embodying my invention;

Fig. 2 is a section on a plane represented by the line 2—2 in Fig. 1, said plane being viewed in the direction of the arrows 2 adjacent the ends of said line;

Fig. 3 is an elevation of a portion of the apparatus shown in Fig. 1, this apparatus being viewed in the direction of the arrow 3 of that figure; and Fig. 4 is a section corresponding to a portion of Fig. 3, with the machine in the act of removing a tire.

The machine illustrated consists of a frame 11 which, in the form shown, may be supported on a floor 12. This frame is cylindrical about a vertical axis 13—13 and is provided with a bottom 14. The machine shown has four brackets 15, but in a machine for heavier or lighter tires more or less brackets may be provided. Secured to the bottom 14 by bolts (not shown) is a cylinder 20, which consists of a cylinder casing 21 having a bore 22 therein. The bottom of the bore 22 is closed by a lower head 23, and the top of the bore is closed by an upper head 24. A piston 25 fitting in fluid-tight relationship in the bore 22 carries a piston rod 26 which projects through the upper head 24. Secured to the upper end of the piston rod 26 is a cylindrical cam ring 27 which is moved up and down by the piston rod 26. A spacer ring 28 rests on top of the cam ring 27.

A wheel 30 from which it is desired to remove a tire 31 rests on the spacer ring 28, and a number of these rings of different thicknesses are provided so that different sizes of wheels may be properly spaced with relation to the cam ring 27, which has a conical lower portion 29.

The upper end of the piston rod 26 is threaded, as shown at 32, and provided with a hand wheel 33 which clamps the wheel 30 between the spacer ring 28 and a washer 34. Oil under pressure is

2 admitted to the bore 22 above the piston 25 by a pipe 35, and to the bore 22 below the piston 25 by a pipe 36. Suitable means (not shown) enable the operator of the device to control the admission and release of this oil so that the piston can be moved up and down at will, thus raising or lowering the wheel 30 with its tire and the cam ring 27.

Each of the brackets 15 has a lever 40 pivoted on a pin 41 carried therein. The inner end of each lever 40 carries a roller 42 which contacts the cam ring 27, the rollers being moved from the full line position 42 shown in Fig. 1 to the dotted line position 43 of that figure by the action of the cam ring 27 and its lower portion 29. The levers 40 are held in the position shown in Fig. 1 by a compression spring 44. The outer end 45 of each lever 40 engages a dog 50 having a curved, wedge-shaped end 51, each dog being so mounted on the frame 11 that it is moved radially of the axis 13—13 by the end 45 of the lever 40. Several notches 52 are provided on the under side of each dog 50 receive the end 45 of the lever 40 and permit a single set of dogs to be used for several sizes of wheels and tires.

The method of operation is as follows:

A spacer ring 28 of proper thickness being selected and each of the dogs 50 being properly adjusted, a wheel 30 with its tire 31 in place thereon is placed on the piston rod 26 and secured in place by the hand wheel 33, the piston 25 being held in its upper position as shown in Fig. 1 by oil under pressure delivered by the pipe 36. All automotive vehicle tires tend to become stuck to the rims of the wheels on which they are carried due to rust and corrosion, and heavy truck tires are very hard to remove from the ring unless considerable force is applied thereto. After the tire is put in place, the operator supplies oil under pressure through the pipe 35, allowing oil to escape through the pipe 36. This causes pressure to be exerted on the top of the piston 25 and forces it downwardly. The rollers 42 are forced outwardly by the conical portion 29 of the cam ring 27 until they ride on the cylindrical portion thereof. The curved ends 51 of the dogs 50 are then forced inwardly between a flange 61, formed on the rim 60 of the wheel 30, and the tire 31 into the position shown in Fig. 4. Continued motion of the piston forces the tire 31 off the rim 61.

By this device, tires can be removed from the rims very quickly and easily even when they are on badly rusted or corroded rims. After the tire 31 is removed, the oil pressure on the piston 25 is reversed, the parts are returnd to the position shown in Fig. 1, and when the wheel is removed the device is ready to receive another tire.

The words "up" and "down" and other words of similar import are used to express the relation of parts and not terrestrial position, as, obviously, the tire remover is quite operative with a horizontal axis.

I claim as my invention:

1. In a device for removing tires from wheels which have rims with a tire-retaining flange, the combination of: walls forming a fluid-tight cylinder; a piston sliding in said cylinder; means for applying fluid pressure to said piston to cause it to move in said cylinder; a piston rod secured to said piston and projecting through said walls in fluid-tight relationship therewith; means for securing a wheel with a tire carried thereon on the outer end of said piston rod; a frame to which said cylinder is secured; a plurality of dogs so mounted in said frame that they can move inwardly and radially toward the axis of said cylinder into a position abutting the side of said tire; a cam ring carried by said piston rod; and a plurality of levers mounted on said frame, each lever having one end engaging a dog and its other end engaging said cam ring to force one of said dogs inwardly as said piston forces said tire to move toward said dogs.

2. In a device for removing tires from wheels which have rims with a tire-retaining flange, the combination of: walls forming a fluid-tight cylinder; a piston sliding in said cylinder; means for applying fluid pressure to said piston to cause it to move in said cylinder; a piston rod secured to said piston and projecting through said walls in fluid-tight relationship therewith; means for securing a wheel with a tire carried thereon on the outer end of said piston rod; a frame to which said cylinder is secured; a plurality of dogs so mounted in said frame that they can move inwardly and radially toward the axis of said cylinder into a position abutting the side of said tire; a cam ring having a cam portion and a dwell portion carried by said piston rod; and a plurality of levers mounted on said frame, each lever having one end engaging a dog and its other end engaging said cam ring to force said dog inwardly, the cam portion of said cam ring first forcing said dogs into tire-engaging position and thereafter the dwell portion of said ring holding them in that position as said tire is moved by said piston toward said dogs.

3. In a device for removing tires from rims, said tires being held on the rims by flanges against which the beads of the tires abut, the combination of: a carrier upon which a rim carrying a tire may be secured; a plurality of dogs having sharp ends adapted to be projected between the bead and rim of a tire; power operated means for causing a relative movement of said dogs and said carrier in a direction axial to said tire; and means actuated by said power operated means for forcing said dogs inwardly in a direction radial to said axial direction.

4. In an axially shifting type of fluid pressure operated tire removing machine adapted to remove tires which are held on the rims of vehicle wheels by flanges which abut against the beads of said tires, the combination of: a frame which remains stationary during the operation of the machine; a carrier adapted to receive and support the rim of the wheel above said frame with the tire in place thereon, said carrier being mounted for movement with relation to the frame along the axis of the tire; power operated means adapted to move said carrier along said axis either up or down within limits along said axis; a plurality of circumferentially spaced dogs mounted on and above said frame and constrained to move in a direction normal and radial to said axis; a series of levers pivoted on said frame, one end of each of said levers engaging one of said dogs; and cam means actuated by said power operated means, said cam means engaging the other end of each of said levers in such a manner as to force said dogs toward said axis as said power operated means moves said tire downwardly toward said frame.

5. In an axially shifting type of fluid pressure operated tire removing machine adapted to remove tires which are held on the rims of vehicle wheels by flanges which abut against the beads of said tires, the combination of: a frame which remains stationary during the operation of the machine; a carrier adapted to receive and support the rim of the wheel above said frame with the tire in place thereon, said carrier being mounted for movement with relation to the frame along the axis of the tire; power operated means adapted to move said carrier along said axis either up or down within limits along said axis; a plurality of circumferentially spaced dogs mounted on and above said frame and constrained to move in a direction normal and radial to said axis; a series of levers pivoted on said frame, one end of each of said levers engaging one of said dogs; and a cam ring attached to and moving with said carrier, said cam ring having a conical surface so placed as to engage the other end of each of said levers in such a manner as to force said dogs toward said axis as said power operated means moves said tire downwardly toward said frame.

JAMES A. SMYSER.

REFERENCES CITED

The following references are of record in the file of this patent:

UNITED STATES PATENTS

| Number | Name | Date |
|---|---|---|
| 492,931 | Baird | Mar. 7, 1893 |
| 788,969 | Walker | May 2, 1905 |
| 1,564,496 | Staugaard | Dec. 8, 1925 |
| 1,724,813 | Weaver et al. | Aug. 13, 1929 |
| 2,373,975 | Plumeau et al. | Apr. 17, 1945 |